United States Patent
Yogo et al.

(10) Patent No.: US 11,927,466 B2
(45) Date of Patent: Mar. 12, 2024

(54) PHYSICAL QUANTITY MEASUREMENT DEVICE INCLUDING A THERMAL FLOW RATE SENSOR WITH A VENTILATION FLOW PATH

(71) Applicant: Hitachi Astemo, Ltd., Hitachinaka (JP)

(72) Inventors: Takayuki Yogo, Hitachinaka (JP); Binti Haridan Fatin Farhanah, Hitachinaka (JP); Hiroyuki Abe, Hitachinaka (JP); Satoshi Ikeo, Hitachinaka (JP); Yuta Chiba, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 419 days.

(21) Appl. No.: 17/291,535

(22) PCT Filed: Nov. 14, 2019

(86) PCT No.: PCT/JP2019/044628
§ 371 (c)(1),
(2) Date: May 5, 2021

(87) PCT Pub. No.: WO2020/110742
PCT Pub. Date: Jun. 4, 2020

(65) Prior Publication Data
US 2021/0396561 A1  Dec. 23, 2021

(30) Foreign Application Priority Data

Nov. 29, 2018 (JP) ................ 2018-223285

(51) Int. Cl.
*G01F 1/69* (2006.01)
*F02D 41/30* (2006.01)
(52) U.S. Cl.
CPC ............. *G01F 1/69* (2013.01); *F02D 41/30* (2013.01)

(58) Field of Classification Search
None
See application file for complete search history.

(56) References Cited

U.S. PATENT DOCUMENTS 8,763,452 B2 * 7/2014 Doi ................... G01F 15/10
73/204.11
9,658,094 B2 * 5/2017 Tokuyasu ............ G01F 1/692
(Continued)

FOREIGN PATENT DOCUMENTS

JP  2015-025822 A  2/2015
JP  2015-094647 A  5/2015
(Continued)

OTHER PUBLICATIONS

International Search Report with English translation and Written Opinion issued in corresponding application No. PCT/JP2019/044628 dated Jan. 21, 2020.

*Primary Examiner* — Harshad R Patel
(74) *Attorney, Agent, or Firm* — Foley & Lardner LLP

(57) ABSTRACT

A physical quantity measurement device is configured to seal a cavity portion on a back surface side of a diaphragm of a thermal air flow rate sensor while improving measurement accuracy. The device may include a lead frame having a mounting surface on which a flow rate sensor which is the thermal air flow rate sensor is mounted, and a flow passage forming member disposed on a back surface opposite to the mounting surface of the lead frame. A ventilation flow path is formed by a first through hole in communication with a cavity portion of the flow rate sensor, a second through hole provided in the lead frame and opened in the mounting surface, and a connection flow path that is defined between the lead frame and the flow passage forming member and connecting the first through hole and the second through hole.

8 Claims, 8 Drawing Sheets

(56) References Cited

U.S. PATENT DOCUMENTS

| | | | |
|---|---|---|---|
| 10,514,287 B2* | 12/2019 | Tashiro | G01F 15/14 |
| 2014/0352424 A1 | 12/2014 | Morino | |
| 2015/0168193 A1* | 6/2015 | Morino | G01F 15/14 |
| | | | 73/202.5 |
| 2015/0338258 A1* | 11/2015 | Kono | G01F 1/692 |
| | | | 73/279 |
| 2019/0162569 A1* | 5/2019 | Tokuyasu | G01F 1/684 |

FOREIGN PATENT DOCUMENTS

| | | |
|---|---|---|
| WO | WO-2013/084259 A1 | 6/2013 |
| WO | WO-2015/033589 A1 | 3/2015 |

\* cited by examiner

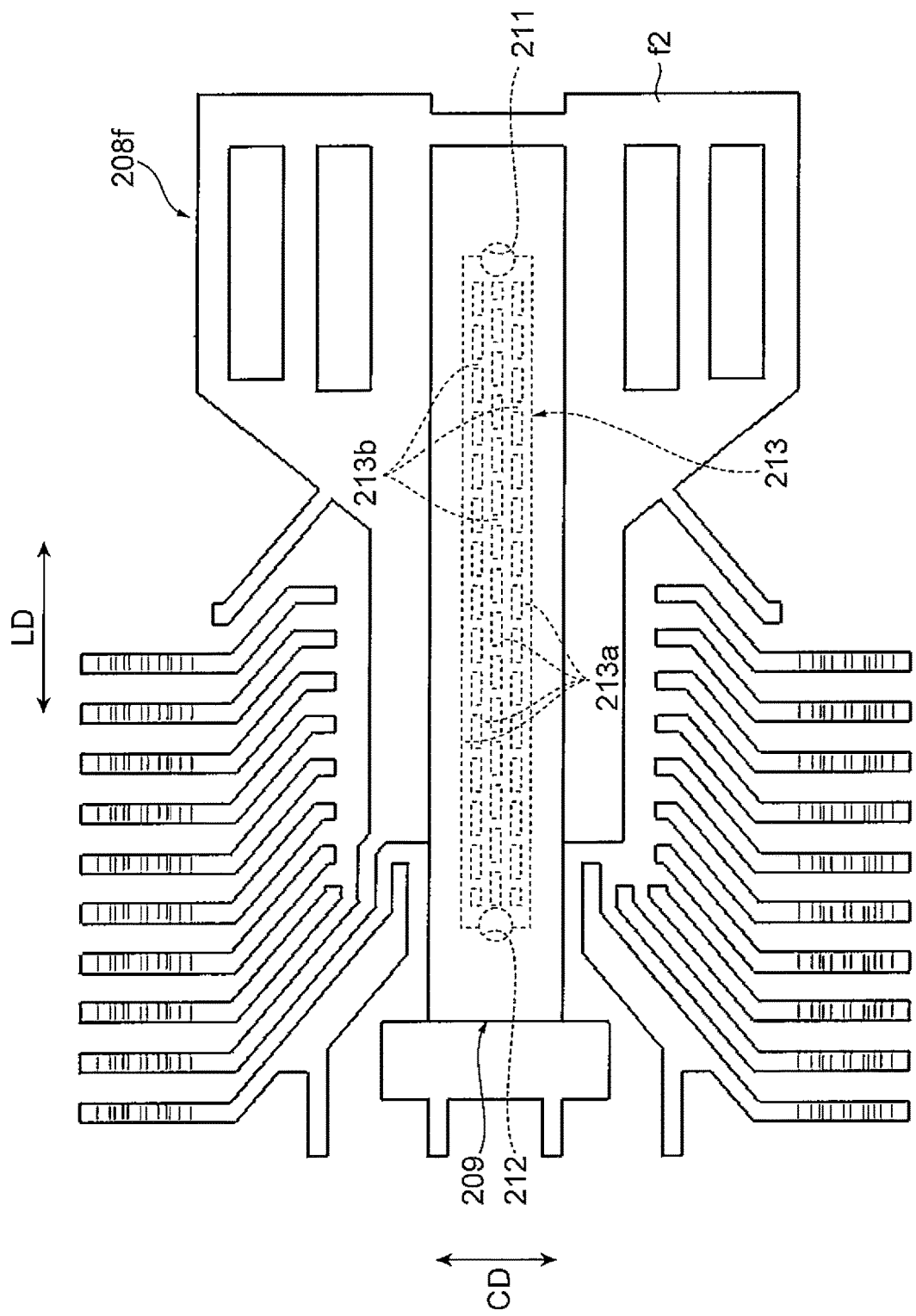

ent device used in the internal combustion engine control
PHYSICAL QUANTITY MEASUREMENT DEVICE INCLUDING A THERMAL FLOW RATE SENSOR WITH A VENTILATION FLOW PATH

TECHNICAL FIELD

The present disclosure relates to a physical quantity measurement device.

BACKGROUND ART

The invention related to a thermal air flow rate sensor has been known from the related art (see PTL 1 below). The invention described in PTL 1 aims to provide the thermal air flow rate sensor with high detection accuracy (see paragraph 0005 and the like in PTL 1). As a means for solving this problem, PTL 1 discloses the thermal air flow rate sensor having the following configuration.

The thermal air flow rate sensor of PTL 1 has a semiconductor element, a support member, a sheet adhesive, and a communication passage.

The semiconductor element has a heating resistor formed in a diaphragm. The support member has a mounting surface on a side on which the semiconductor element is mounted, and a hole on one side of the mounting surface that is opened in a region corresponding to a back surface side of the diaphragm. The sheet adhesive adheres between the semiconductor element and the support member and has holes. The communication passage is formed by using the holes formed in the support member and the holes formed in the sheet adhesive (see claim 1 and the like in PTL 1).

This conventional thermal air flow rate sensor prevents a cavity portion on the back surface side of the diaphragm from being sealed by the communication passage. More specifically, the communication passage is formed by a groove provided in the support member and a lead frame, and a ventilating hole in a cavity region of the support member and a ventilating hole in a region without a semiconductor element communicate with each other via the communication passage (see paragraph 0017, FIG. 4, and the like in PTL 1). Further, the same effect can be obtained when the groove is formed in the lead frame to form the communication passage between the support member and the lead frame (see paragraph 0019 and the like in PTL 1).

CITATION LIST

Patent Literature

PTL 1: JP 2015-025822 A

SUMMARY OF INVENTION

Technical Problem

In the physical quantity measurement device including the thermal air flow rate sensor, it is necessary to further improve the measurement accuracy, and like the communication passage of the conventional thermal air flow rate sensor, a configuration is required to prevent the cavity portion on the back surface of the diaphragm of the thermal air flow rate sensor from being sealed.

The present disclosure provides a physical quantity measurement device capable of preventing a sealing of a cavity portion on a back surface side of a diaphragm of a thermal air flow rate sensor while improving measurement accuracy of the thermal air flow rate sensor as compared with the related art.

Solution to Problem

According to an aspect of the present disclosure, a physical quantity measurement device includes a thermal air flow rate sensor, a ventilation flow path that prevents a sealing of a cavity portion on a back surface side of a diaphragm of the thermal air flow rate sensor, a lead frame that has a mounting surface on which the thermal air flow rate sensor is mounted, and a flow passage forming member that is disposed on a back surface opposite to the mounting surface of the lead frame, in which the ventilation flow path is formed by a first through hole communicating with the cavity portion and provided on the lead frame, a second through hole that is opened on the mounting surface and provided on the lead frame, and a connection flow path defined between the lead frame and the flow passage forming member and connecting the first through hole and the second through hole.

Advantageous Effects of Invention

According to one aspect of the present disclosure, it is possible to provide the physical quantity measurement device capable of preventing the sealing of the cavity portion on the back surface side of the diaphragm of the thermal air flow rate sensor while improving the measurement accuracy of the thermal air flow rate sensor as compared with the related art.

BRIEF DESCRIPTION OF DRAWINGS

FIG. 6 is a plan view of a lead frame and a flow passage forming member of the chip package illustrated in FIG. 5.

DESCRIPTION OF EMBODIMENTS

Hereinafter, embodiments of a physical quantity measurement device according to the present disclosure will be described with reference to the drawings.

Figure 1:
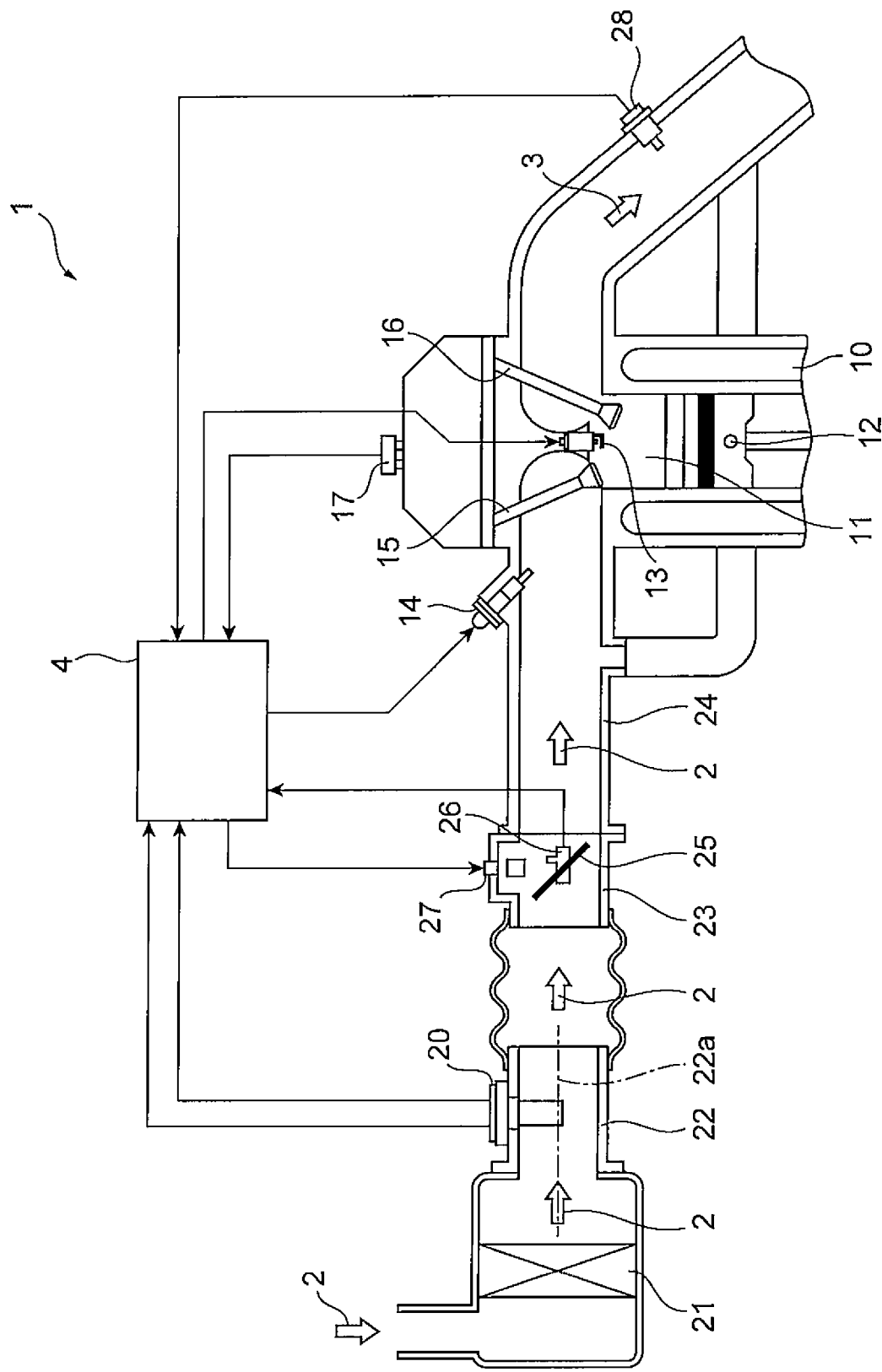
FIG. 1 is a system diagram illustrating an example of an electronic fuel injection type internal combustion engine control system.

FIG. 1 is a system diagram of an electronic fuel injection type internal combustion engine control system 1 using a physical quantity measurement device 20 according to a first embodiment of the present disclosure.

In the internal combustion engine control system 1, intake air is sucked from an air cleaner 21 as a measured gas 2 based on an operation of an internal combustion engine 10 including an engine cylinder 11 and an engine piston 12. The intake air is introduced into a combustion chamber of the engine cylinder 11 via an intake body which is a main passage 22, a throttle body 23, and an intake manifold 24. A physical quantity of the measured gas 2, which is the intake air introduced into the combustion chamber, is measured by the physical quantity measurement device 20. Further, fuel is supplied from a fuel injection valve 14 based on the physical quantity measured by the physical quantity measurement device 20, and is introduced into the combustion chamber together with the intake air in a state of an air-fuel mixture.

Note that in the present embodiment, the fuel injection valve 14 is provided in an intake port of the internal combustion engine 10, the fuel injected into the intake port is mixed with the intake air, and the air-fuel mixture of the fuel and the intake air is introduced into the combustion chamber via the intake valve 15 and burns to generate mechanical energy. The air-fuel mixture introduced into the combustion chamber is in the state in which fuel and air are mixed, and is explosively burned by spark ignition of an ignition plug 13 to generate mechanical energy. The burned gas is introduced into an exhaust pipe from an exhaust valve 16, and is discharged from the exhaust pipe to an outside of a vehicle as exhaust gas 3.

The flow rate of the measured gas 2, which is the intake air introduced into the combustion chamber, is controlled by a throttle valve 25 whose opening degree changes based on an operation of an accelerator pedal. In addition, a fuel supply amount is controlled based on the flow rate of the intake air introduced into the combustion chamber. By controlling the opening degree of the throttle valve 25 to control the flow rate of the intake air introduced into the combustion chamber, the mechanical energy generated by the internal combustion engine 10 can be controlled.

The physical quantity measurement device 20 measures physical quantities such as the flow rate, temperature, humidity, and pressure of the measured gas, which is the intake air taken in through the air cleaner 21 and flowing through the main passage 22. The physical quantity measurement device 20 outputs an electric signal according to the physical quantity of the intake air. An output signal of the physical quantity measurement device 20 is input to a control device 4.

In addition, an output of a throttle angle sensor 26 for measuring the opening degree of the throttle valve 25 is input to the control device 4, and furthermore, in order to measure a position and state of the engine piston 12, the intake valve 15, or the exhaust valve 16 of the internal combustion engine 10 and a rotation speed of the internal combustion engine 10, an output of a rotation angle sensor 17 is input to the control device 4. An output of an oxygen sensor 28 is input to the control device 4 in order to measure a state of a mixing ratio of the amount of fuel and the amount of air from the state of the exhaust gas 3.

The control device 4 calculates a fuel injection amount and an ignition timing based on the physical quantity of the intake air which is the output of the physical quantity measurement device 20 and the rotation speed of the internal combustion engine 10 measured based on the output of the rotation angle sensor 17. Based on these calculation results, the amount of fuel supplied from the fuel injection valve 14 and the ignition timing at which ignition is performed by the ignition plug 13 are controlled. The fuel supply amount or the ignition timing is actually finely controlled based on a temperature measured by the physical quantity measurement device 20, a state of change in the throttle angle, a state of change in the engine speed, and a state of an air-fuel ratio measured by the oxygen sensor 28. Further, the control device 4 controls the amount of air bypassing the throttle valve 25 by an idle air control valve 27 in an idle operation state of the internal combustion engine 10, and controls the rotation speed of the internal combustion engine 10 in the idle operation state.

Any of the fuel supply amount or ignition timing, which is the main control quantity of the internal combustion engine 10, is calculated using the output of the physical quantity measurement device 20 as the main parameter. Therefore, it is important to improve the measurement accuracy of the physical quantity measurement device 20, suppress the change with time, and improve the reliability in order to improve the control accuracy and reliability of the vehicle. In recent years, particularly, there has been a very high demand for fuel efficiency of the vehicle, and a very high demand for exhaust gas purification. In order to meet these demands, it is extremely important to improve the measurement accuracy of the physical quantity of the intake air which is the measured gas 2 measured by the physical quantity measurement device 20. In addition, it is important that the physical quantity measurement device 20 maintains high reliability.

Vehicles equipped with the physical quantity measurement device 20 are used in the environment where the change in temperature or humidity is large. It is preferable that the physical quantity measurement device 20 also considers the response to the change in temperature or humidity in the usage environment and the response to dust, pollutants, or the like. In addition, the physical quantity measurement device 20 is mounted on the intake pipe which is affected by the heat generated from the internal combustion engine 10. For this reason, the heat generated by the internal combustion engine 10 is transmitted to the physical quantity measurement device 20 via the intake pipe which is the main passage 22. Since the physical quantity measurement device 20 measures the flow rate of the measured gas by performing heat transfer with the measured gas, it is important to suppress the influence of heat from the outside as much as possible.

As described below, the physical quantity measurement device 20 mounted on the vehicle simply solves the problems described in the column of the problem to be solved by the invention, and achieves the effects described in the column of the effect of the invention. As will be described below, the physical quantity measurement device 20 fully considers the above-mentioned various problems, solves various problems required as a product, and achieves various effects. Specific problems to be solved by the physical quantity measurement device 20 or specific effects to be achieved will be described in the description of the following embodiments.

Figure 2:
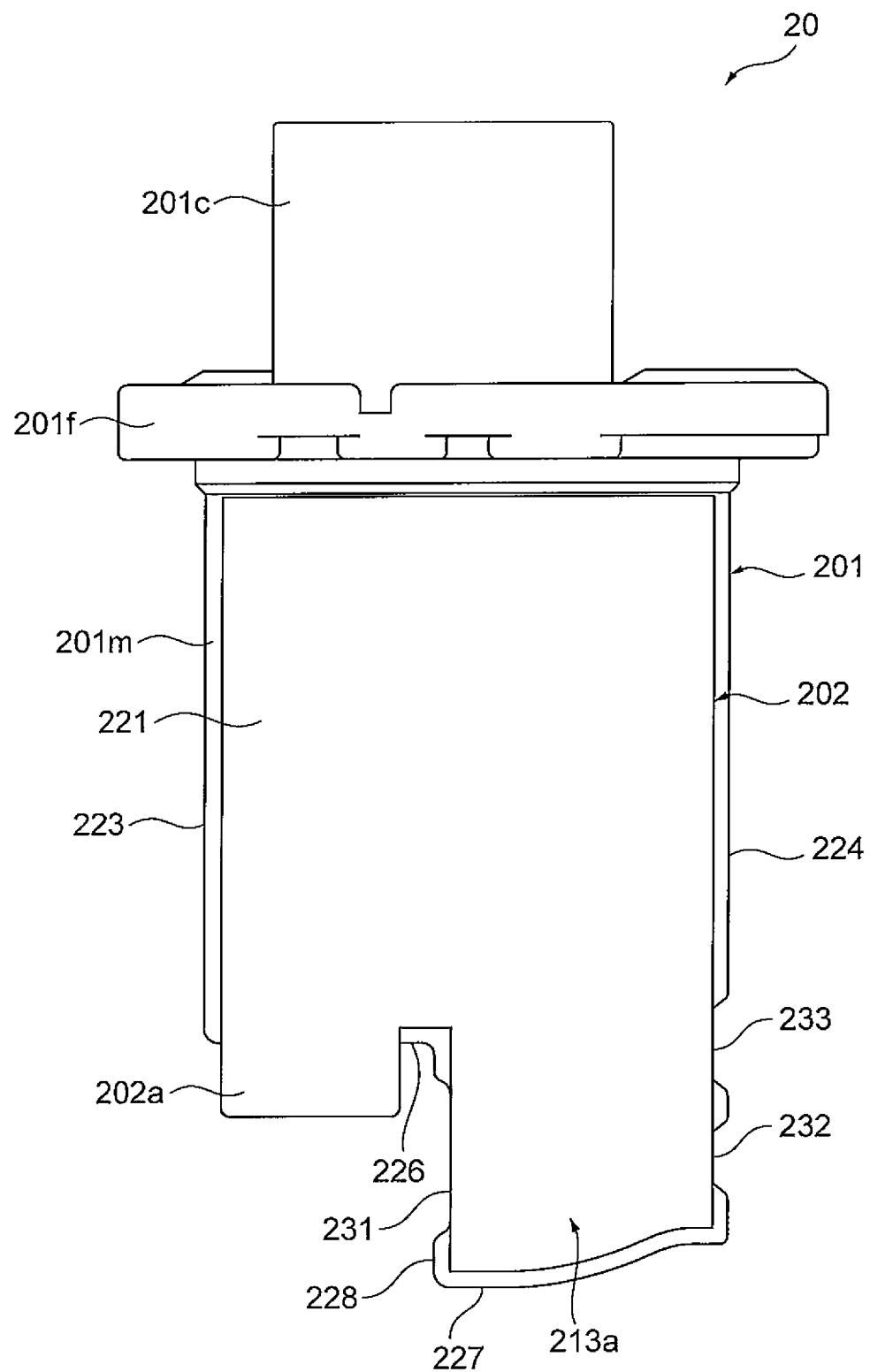
FIG. 2 is a front view of the physical quantity measurement device used in the internal combustion engine control system illustrated in FIG. 1.
Figure 3:
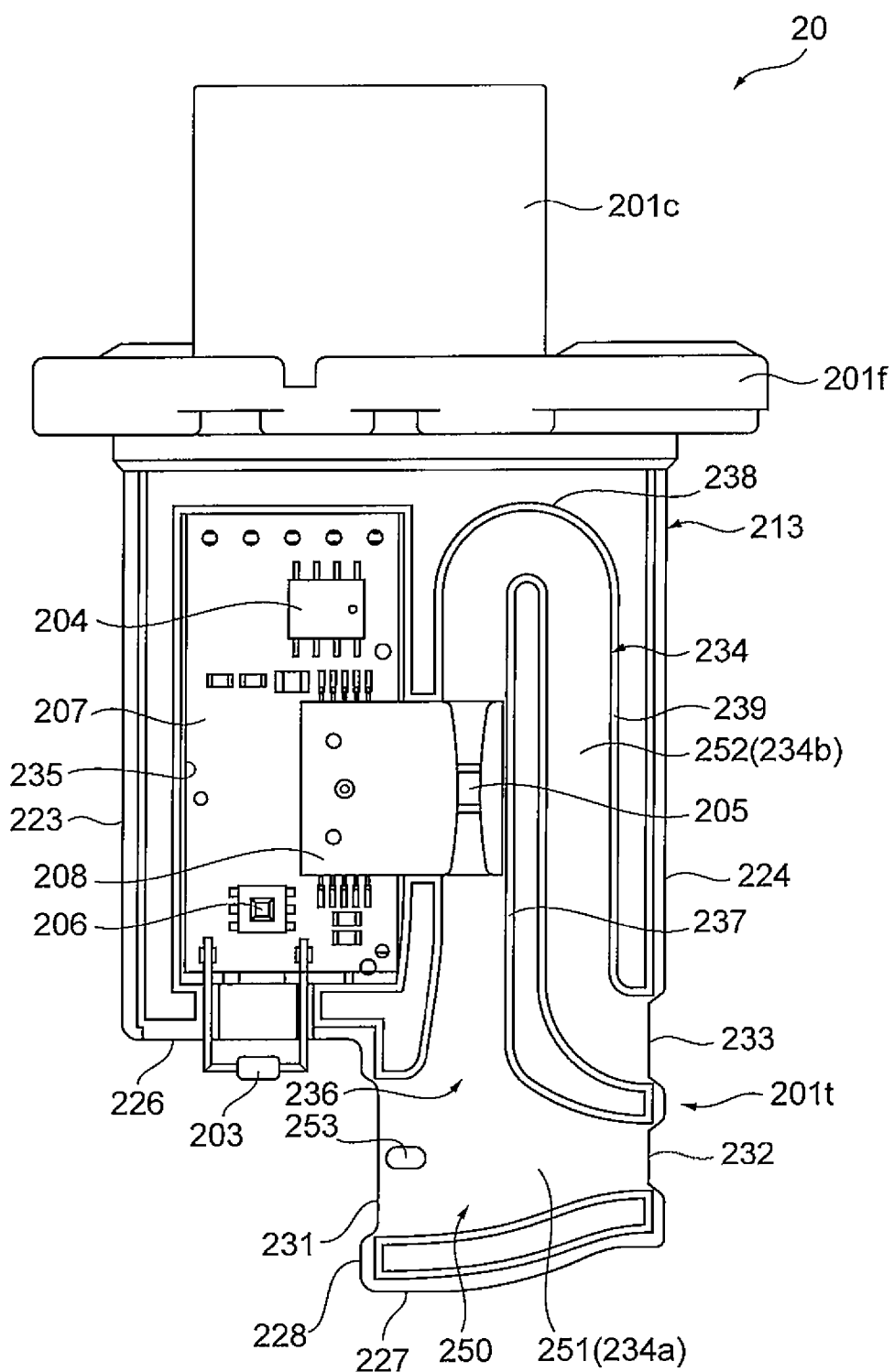
FIG. 3 is a front view of the physical quantity measurement device illustrated in FIG. 2 without a cover.

FIG. 2 is a front view of the physical quantity measurement device 20 illustrated in FIG. 1. FIG. 3 is a front view of the physical quantity measurement device 20 illustrated in FIG. 2 without a cover 202. Note that FIG. 3 omits an illustration of a sealing material that seals a circuit board 207.

The physical quantity measurement device 20 is used by being inserted into the main passage 22 from a mounting hole mounted on a passage wall of the main passage 22. The physical quantity measurement device 20 includes a housing 201 and the cover 202 attached to the housing 201. The housing 201 is formed by injection molding a synthetic resin material, and the cover 202 is constituted by a plate-like member made of a conductive material such as an aluminum alloy. The cover 202 is formed in the shape of a thin plate and has a wide flat cooling surface.

The housing 201 has a flange 201f fixed to the intake body which is the main passage 22, a connector 201c that protrudes from the flange 201f and is exposed to the outside from the intake body to perform an electrical connection with an external device, and a measurement unit 201m that extends to protrude from the flange 201f toward a center of the main passage 22.

The flange 201f has, for example, a substantially rectangular shape in a plan view, having a predetermined plate thickness, and has through holes provided in corners. The flange 201f is screwed into a screw hole of the main passage 22, for example, by inserting a fixing screw into the through hole provided in the corner, and thus is fixed to the main passage 22.

For example, the connector 201c has four external terminals and a correction terminal provided inside thereof. The external terminals are a terminal for outputting physical quantities such as flow rate or temperature, which are the measurement results of the physical quantity measurement device 20, and a power supply terminal for supplying DC power for operating the physical quantity measurement device 20. The correction terminal is a terminal used to measure the produced physical quantity measurement device 20, obtain correction values for each physical quantity measurement device 20, and store the correction values in a memory inside the physical quantity measurement device 20.

The measurement unit 201m has a thin and long shape extending from the flange 201f toward the center of the main passage 22, and has a wide front surface 221 and a back surface, and an upstream end surface 223 and a downstream end surface 224 which are a pair of narrow side surfaces. The measurement unit 201m is inserted inward from the mounting hole provided in the main passage 22, and is fixed to the main passage 22 via the flange 201f, for example, by bringing the flange 201f into contact with the main passage 22 and fixing the flange 201f to the main passage 22 with a screw.

The measurement unit 201m protrudes from an inner wall of the main passage 22 toward a central axis 22a of the main passage 22 in a state where the physical quantity measurement device 20 is attached to the main passage 22. Then, the front surface 221 and the back surface are arranged in parallel along the central axis 22a of the main passage 22, and of the narrow upstream end surface 223 and the downstream end surface 224 of the measurement unit 201m, the upstream end surface 223 on one side of the measurement unit 201m in a lateral direction is disposed to face the upstream side of the main passage 22, and the downstream end surface 224 on the other side of the measurement unit 201m in the lateral direction is disposed to face the downstream side of the main passage 22.

The front surface 221 of the measurement unit 201m is flat from the upstream end surface 223 to the downstream end surface 224 along the lateral direction. On the other hand, the back surface of the measurement unit 201m has a corner on the downstream end surface 224 side chamfered thereon, and is inclined in a direction gradually approaching the front surface as it moves from an intermediate position in the lateral direction to the downstream end surface 224. As a result, a cross-sectional shape of the measurement unit 201m is so-called streamline. Therefore, the measured gas 2 flowing from the upstream of the main passage 22 can be smoothly introduced into the downstream along the front surface 221 and the back surface of the measurement unit 201m, and a fluid resistance of the measurement unit 201m against the measured gas 2 can be reduced.

The measurement unit 201m has a lower surface 226 on the upstream side of the main passage 22 and a lower surface 227 on the downstream side of the main passage 22 in a state where an end in a protruding direction is formed in a stepped shape and the physical quantity measurement device 20 is attached to the main passage 22. In the measurement unit 201m, the lower surface 227 on the downstream side protrudes in the protruding direction from the lower surface 226 on the upstream side, and a stepped surface 228 connecting the lower surface 226 on the upstream side and the lower surface 227 on the downstream side is disposed to face the upstream side of the main passage 22.

In addition, in the measurement unit 201m, an inlet 231 for taking a part of the measured gas 2 such as the intake air into a sub-passage in the measurement unit 201m is opened on the stepped surface 228 of a tip portion 201t which is on an opposite side to the flange 201f and protrudes from the lower surface 226 on the upstream side. Then, a first outlet 232 and a second outlet 233 for returning the measured gas 2 taken into the sub-passage in the measurement unit 201m to the main passage 22 are opened on the downstream end surface 224 of the tip portion 201t of the measurement unit 201m.

That is, the measurement unit 201m has an upstream end surface 223 as a first wall portion disposed toward the upstream side in the flow direction of the measured gas 2 of the main passage 22. In addition, the measurement unit 201m has the stepped surface 228 of the tip portion 201t as a second wall portion which is located on the downstream side in the flow direction of the measured gas 2 in the main passage 22 from the upstream end surface 223 as the first wall portion and disposed toward the upstream side in the flow direction of the measured gas 2. An inlet 231 of the sub-passage is opened on the stepped surface 228 of this tip portion 201t.

Since the inlet 231 of the sub-passage is provided in the tip portion 201t of the measurement unit 201m extending from the flange 201f toward the center of the main passage 22, the physical quantity measurement device 20 can take a gas of a portion in the vicinity of a center away from an inner wall surface of the main passage 22 into the sub-passage, not the vicinity of the inner wall surface of the main passage 22. Therefore, the physical quantity measurement device 20 can measure the flow rate of gas in the portion away from the inner wall surface of the main passage 22, and can suppress the decrease in the measurement accuracy due to the influence of heat or the like.

Near the inner wall surface of the main passage 22, the temperature of the main passage 22 is easily affected, and the temperature of the measured gas 2 differs from the original temperature of gas, which is different from the average state of the main gas in the main passage 22. In particular, when the main passage 22 is the intake body of the engine, it is often maintained at a high temperature due to the influence of heat from the engine. For this reason, the gas in the vicinity of the inner wall surface of the main passage 22 is often higher than the original temperature of the main passage 22, which is a factor of causing the decrease in the measurement accuracy. In addition, the fluid resistance is large in the vicinity of the inner wall surface of the main passage 22, and a flow velocity is lower than the average flow velocity of the main passage 22. Therefore, when the gas in the vicinity of the inner wall surface of the main passage 22 is taken into the sub-passage as the measured gas 2, the decrease in the flow velocity with respect to the average flow velocity of the main passage 22 may lead to a measurement error.

Since the physical quantity measurement device 20 has an inlet 231 provided in the tip portion 201t of the thin and long measurement unit 201m extending from the flange 201f toward the center of the main passage 22, the measurement error related to the decrease in the flow velocity in the vicinity of the inner wall surface of the main passage 22 can be reduced. Further, in the physical quantity measurement device 20, the inlet 231 is not only provided in the tip portion 201t of the measurement unit 201m extending from the flange 201f toward the center of the main passage 22, but the first outlet 232 and the second outlet 233 of the sub-passage are also provided in the tip portion 201t of the measurement unit 201m, so it is possible to further reduce the measurement error.

In the physical quantity measurement device 20, the measurement unit 201m has a shape that extends long along the axis from the outer wall of the main passage 22 toward the center, but the width of the upstream end surface 223 and the downstream end surface 224 is narrower than the width of the front surface 221, and the measurement unit 201m has a plate-like shape. As a result, the physical quantity measurement device 20 can suppress the fluid resistance against the measured gas 2 to a small value.

The measurement unit 201m is provided with a sub-passage groove 250 for forming a sub-passage 234 and a circuit chamber 235 for accommodating a circuit board 207. The circuit chamber 235 and the sub-passage groove 250 are recessed in the front surface of the measurement unit 201m, and are disposed separately on one side and the other side of the measurement unit 201m in the lateral direction. The circuit chamber 235 is disposed on the upstream side in the flow direction of the measured gas 2 in the main passage 22, and the sub-passage 234 is disposed on the downstream side in the flow direction of the measured gas 2 in the main passage 22 from the circuit chamber 235. Note that in the flow direction of the measured gas 2 in the main passage 22, a space can be saved by setting the surface on the upstream side of the wall portion on the upstream side of the circuit chamber 235 as the upstream end surface 223 of the measurement unit 201m.

The sub-passage groove 250 forms the sub-passage 234 in cooperation with the cover 202. The sub-passage 234 extends along the longitudinal direction of the measurement unit 201m, which is the protruding direction of the measurement unit 201m. The sub-passage groove 250 forming the sub-passage 234 has a first sub-passage groove 251 and a second sub-passage groove 252 branching in the middle of the first sub-passage groove 251.

The first sub-passage groove 251 is formed to extend along the lateral direction of the measurement unit 201m between the inlet 231 that is opened to the stepped surface 228 of the tip portion 201t of the measurement unit 201m and the first outlet 232 that is opened in the downstream end surface 224 of the tip portion 201t of the measurement unit 201m. The inlet 231 is opened so as to face the upstream side in the flow direction of the measured gas 2 in the main passage 22. In the first sub-passage groove 251, a first sub-passage 234a, which extends from the inlet 231 along the central axis 22a of the main passage 22 and reaches the first outlet 232, is formed in the cover 202.

The first sub-passage 234a takes the measured gas 2 flowing in the main passage 22 from the inlet 231 and returns the taken measured gas 2 from the first outlet 232 to the main passage 22. The first sub-passage 234a extends from the inlet 231 along the flow direction of the measured gas 2 in the main passage 22 and is connected to the first outlet 232. The first sub-passage 234a has a branch portion 236 between the inlet 231 and the first outlet 232.

The branch portion 236 is provided in the vicinity of the inlet 231 on the upstream side of the measured gas 2 at the time of a forward flow in the first sub-passage 234a extending along the central axis 22a of the main passage 22. As illustrated in FIG. 1, the measured gas 2 flows from the air cleaner 21 toward the internal combustion engine 10 along the central axis 22a of the main passage 22 at the time of the forward flow. At the time of the forward flow, the measured gas 2 flowing through the main passage 22 is taken into the first sub-passage 234a from the inlet 231 and flows toward the first outlet 232 in the first sub-passage 234a, and flows into the second sub-passage 234b from the branch portion 236.

The second sub-passage groove 252 is branched toward a base end portion of the measurement unit 201m, that is, the flange 201f, at an intermediate position of the first sub-passage groove 251 and extends in the longitudinal direction of the measurement unit 201m, that is, in the direction intersecting the central axis 22a of the main passage 22, for example, in the direction substantially orthogonal to the central axis 22a. Further, the second sub-passage groove 252 extends in a direction curved and folded back toward the tip portion 201t in the vicinity of the flange 201f of the measurement unit 201m, for example, in a U-shape or an arc shape, and a direction intersecting the longitudinal direction of the measurement unit 201m, that is, the central axis 22a of the main passage 22, for example, a direction substantially orthogonal to the central axis 22a.

The second sub-passage groove 252 is finally bent toward the downstream end surface 224 of the measurement unit 201m so as to be curved, for example, in an arc shape, and is connected to the second outlet 233. The second outlet 233 is opened so as to face the downstream side in the flow direction of the measured gas 2 in the main passage 22. The second outlet 233 has an opening area substantially equal to or slightly larger than that of the first outlet 232, and is formed at a position adjacent to the base end portion of the measurement unit 201m in the longitudinal direction from the first outlet 232. In the second sub-passage groove 252, the second sub-passage 234b, which branches from the first sub-passage 234a toward the flange 201f and reaches the second outlet 233, is formed in the cover 202.

The second sub-passage 234b makes the measured gas 2, which branches from the first sub-passage 234a and flows in, pass therethrough and returns the measured gas 2 from the second outlet 233 to the main passage 22. The second sub-passage 234b has a reciprocating route along the longitudinal direction of measurement unit 201m. More specifically, the second sub-passage 234b has, for example, a linear upstream portion 237, an arc-shaped or U-shaped curved portion 238, and a linear downstream portion 239.

The upstream portion 237 branches, for example, from the branch portion 236 of the first sub-passage 234a and extends substantially linearly in the direction intersecting the central axis 22a of the main passage 22. The upstream portion 237 extends, for example, in a direction substantially orthogonal to the central axis 22a of the main passage 22, that is, in a direction extending from the branch portion 236 of the first sub-passage 234a toward the flange 201f.

The curved portion 238 is connected to, for example, a downstream end portion of the upstream portion 237 in the vicinity of the flange 201f, and is curved so as to fold back toward the central axis 22a of the main passage 22. The curved portion 238 has, for example, an arc shape or a U shape, and is curved so as to fold the second sub-passage 234b by 180° in a reverse direction.

The downstream portion 239 is connected to, for example, the downstream end portion of the curved portion 238 in the vicinity of the flange 201f and extends substantially linearly toward the central axis 22a of the main passage 22.

The downstream portion 239 extends toward, for example, the tip portion 201t of the measurement unit 201m substantially parallel to the upstream portion 237, and extends toward the downstream side from the branch portion 236 in the first sub-passage 234a. The downstream portion 239 is connected to the second outlet 233 by being curved in the direction along the central axis 22a of the main passage in the vicinity of the second outlet 233 of the tip portion 201t.

The second sub-passage 234b has a curved shape. More specifically, the upstream portion 237 of the second sub-passage 234b branches from the branch portion 236 of the first sub-passage 234a and extends in the direction intersecting the central axis 22a of the main passage 22. The curved portion 238 of the second sub-passage 234b is curved so as to fold back from the upstream portion 237 toward the central axis 22a of the main passage 22. The downstream portion 239 of the second sub-passage 234b extends from the curved portion 238 toward the central axis 22a of the main passage 22. The curved shape of the second sub-passage 234b is formed by the upstream portion 237, the curved portion 238, and the downstream portion 239.

Although not illustrated, for example, the second outlet 233 is omitted, the downstream portion 239 of the second sub-passage 234b is connected to the downstream side from the branch portion 236 of the first sub-passage 234a, and the second sub-passage 234b may be joined to the first sub-passage 234a.

In the second sub-passage 234b, for example, the flow rate sensor 205 is disposed in the upstream portion 237.

More specifically, in the upstream portion 237 of the second sub-passage 234b, the flow rate sensor 205 is disposed in an intermediate portion between the first sub-passage 234a and the curved portion 238. By having the curved shape as described above, the second sub-passage 234b can secure a longer passage length, and when a pulsation occurs in the measured gas 2 in the main passage 22, the influence on the flow rate sensor 205 can be reduced.

According to the above configuration, the sub-passage 234 can be formed along the longitudinal direction which is the protruding direction of the measurement unit 201m, and the length of the sub-passage 234 can be sufficiently long. As a result, the physical quantity measurement device 20 can be provided with the sub-passage 234 having a sufficient length. Therefore, the physical quantity measurement device 20 can suppress the fluid resistance to a small value and can measure the physical quantity of the measured gas 2 with high accuracy.

Since the first sub-passage 234a extends from the inlet 231 along the lateral direction of the measurement unit 201m, that is, the central axis 22a of the main passage 22, and reaches the first outlet 232, foreign matters such as dust that penetrates into the first sub-passage 234a from the inlet 231 can be discharged from the first outlet 232 as they are. As a result, it is possible to suppress the foreign matters from penetrating into the second sub-passage 234b and suppress the influence on the flow rate sensor 205 disposed in the second sub-passage 234b.

In the inlet 231 and the first outlet 232 of the first sub-passage 234a, an opening area of the inlet 231 is larger than that of the first outlet 232. By making the opening area of the inlet 231 larger than that of the first outlet 232, the measured gas 2 that has flowed into the first sub-passage 234a can be reliably guided to the second sub-passage 234b that branches in the middle of the first sub-passage 234a.

In the vicinity of the inlet 231 of the first sub-passage groove 251, a protrusion 253 is provided at the central position of the inlet 231 in the longitudinal direction of the measurement unit 201m. The protrusion 253 bisects the size of the inlet 231 in the longitudinal direction of the measurement unit 201m, and makes the opening areas of each of the bisected inlets 231 smaller than the opening areas of the first outlet 232 and the second outlet 233. The protrusion 253 can restrict a size of foreign matters that can penetrate into the first sub-passage 234a from the inlet 231 to be smaller than that of the first outlet 232 and the second outlet 233, and prevent the first outlet 232 or the second outlet 233 from being blocked by the foreign matters.

The circuit board 207 is housed in the circuit chamber 235 provided on one side of the lateral direction of the measurement unit 201m. The circuit board 207 has a rectangular shape extending along the longitudinal direction of the measurement unit 201m, and has a chip package 208, a pressure sensor 204, a temperature/humidity sensor 206, and an intake air temperature sensor 203 mounted on the surface thereof. The circuit board 207 has a mounting portion common to all sensors, and can be commonly used for mounting patterns of various sensors. The surface of the circuit board 207 is disposed substantially parallel to the measured gas 2 flowing through, for example, the main passage 22. This makes it possible to reduce the thickness of the measurement unit 201m and reduce the pressure loss of the measured gas 2 flowing through the main passage 22.

The chip package 208 is mounted on the circuit board 207. The chip package 208 is mounted with, for example, the flow rate sensor 205 and LSI which is an electronic component for driving the flow rate sensor 205, and sealed by a transfer mold. The chip package 208 is mounted in a state where a part of the chip package 208 protrudes from the circuit board 207 into the second sub-passage 234b at the center position in the longitudinal direction of the circuit board 207 so that the flow rate sensor 205 is disposed in the second sub-passage 234b.

The chip package 208 is disposed between the sub-passage 234 and the circuit chamber 235. As a result, the circuit chamber 235 and the sub-passage 234 are separated, and the flow in the flow rate sensor 205 disposed in the chip package 208 is rate-determined by the shape of the sub-passage 234. Therefore, the sub-passage 234 has no barrier that obstructs the flow of the measured gas 2, and the stable flow of the measured gas 2 can be supplied to the flow rate sensor 205. Therefore, it is possible to miniaturize the measurement unit 201m while maintaining flow velocity sensitivity, noise performance, and pulsation characteristics of the flow rate sensor.

Note that the flow rate sensor 205 does not necessarily have to be provided in the chip package 208. For example, the flow rate sensor 205 may be disposed on the sub-passage 234 by protruding a part of the circuit board 207, or the flow rate sensor 205 mounted on the circuit board 207 may be disposed on the sub-passage 234 by a plate-like support.

The flow rate sensor 205 and the LSI may be integrally formed on the same semiconductor element or may be formed as different semiconductor elements. The flow rate sensor 205 is sealed with a resin so that the flow rate measurement unit on the surface thereof is at least exposed. Although the structure in which the LSI is provided in the chip package 208 has been described, the structure in which the LSI is mounted on the circuit board 207 may be used. The advantage of providing the LSI in the chip package 208 is that it is not necessary to mount the LSI on the circuit board 207, which contributes to the miniaturization of the circuit board 207.

The chip package 208 has a recessed groove extending along the flow direction of the measured gas 2 on the upstream portion of the second sub-passage 234b, and a bottom of the recessed groove is provided with the flow rate sensor 205. The recessed groove of the chip package 208 has a squeezing shape in which the width gradually narrows from both end portions to the center in the flow direction of the measured gas 2 that flows along the upstream portion of the second sub-passage 234b, and the flow rate sensor 205 is disposed in the narrowest center. Due to this squeezing shape, the measured gas 2 flowing through the sub-passage 234 is rectified, and the influence of noise can be reduced.

The pressure sensor 204 is mounted on the base end portion side of the circuit board 207 in the longitudinal direction from the chip package 208, and the temperature/humidity sensor 206 is mounted on a tip side of the circuit board 207 in the longitudinal direction from the chip package 208. A lead of the intake air temperature sensor 203 is connected to the surface of the circuit board 207. The intake air temperature sensor 203 is mounted so that the lead of the intake air temperature sensor 203 is connected to the position of the tip side of the circuit board 207 in the longitudinal direction from the temperature/humidity sensor 206, and the sensor body 203b is disposed at a position exposed to the outside of the measurement unit 201m so as to protrude from the circuit board 207 in the longitudinal direction.

The intake air temperature sensor 203 is disposed between the upstream end surface 223 on the flange 201f side of the measurement unit 201m and the stepped surface 228 of the tip portion 201t. The intake air temperature sensor 203 is mounted on the circuit board 207 and is provided to be exposed to the outside of the measurement unit 201m. The intake air temperature sensor 203 is constituted by an axial lead component that has a columnar sensor body and a pair of leads protruding in directions away from each other at both end portions of the sensor body in the axial direction. The measurement unit 201m is provided with a protector 202a for protecting the intake air temperature sensor 203.

The measurement unit 201m has (1) the pressure sensor 204, (2) the flow rate sensor 205, (3) the temperature/humidity sensor 206, and (4) the intake air temperature sensor 203 in order from the base end portion side toward the tip portion side along the longitudinal direction thereof (toward the protruding direction of the measurement unit 201m). The pressure sensor 204 measures the pressure of the measured gas 2, and the flow rate sensor 205 measures the flow rate of the measured gas 2. The temperature/humidity sensor 206 measures the humidity of the measured gas 2, and the intake air temperature sensor measures the temperature of the measured gas 2.

Figure 4:
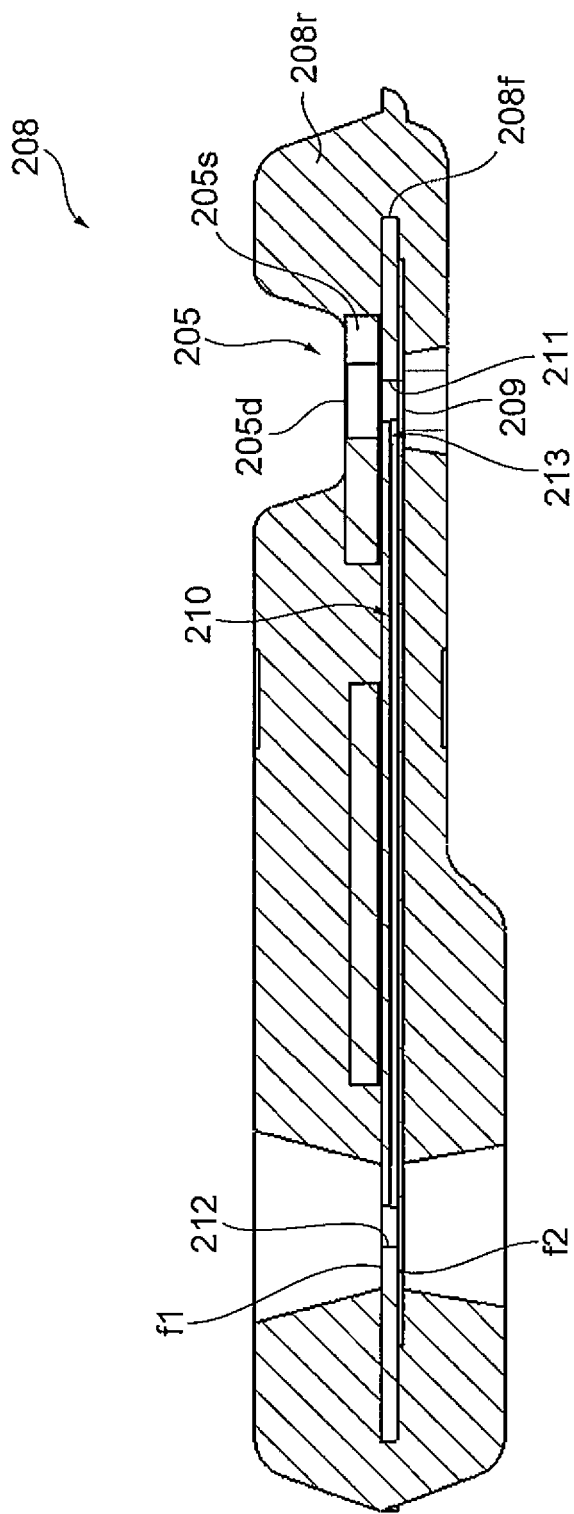
FIG. 4 is a cross-sectional view of a chip package of the physical quantity measurement device illustrated in FIG. 3.
Figure 5:
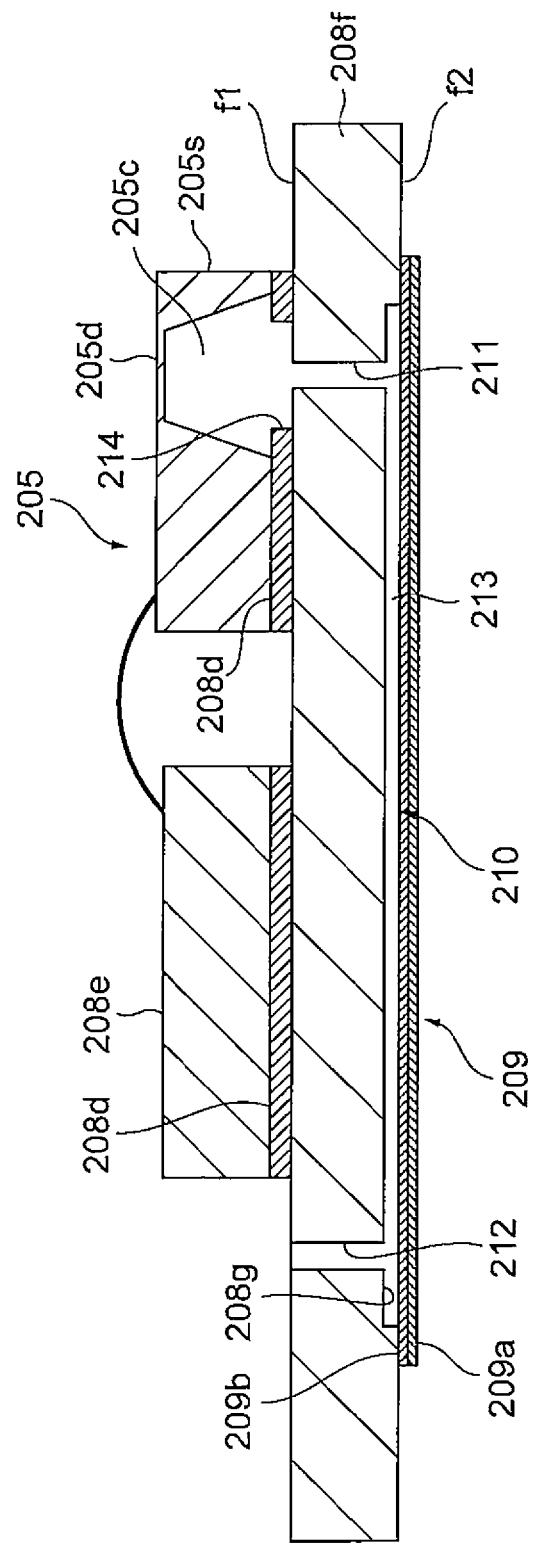
FIG. 5 is a schematic cross-sectional view in which a resin for sealing the chip package illustrated in FIG. 4 is omitted.

FIG. 4 is a cross-sectional view of the chip package 208 illustrated in FIG. 3 in a cross section along the main flow direction of the measured gas 2 flowing through the main passage 22. FIG. 5 is a schematic cross-sectional view of the lead frame 208f of the chip package 208 illustrated in FIG. 4, the flow rate sensor 205, and the flow passage forming member 209. FIG. 6 is a plan view of the lead frame 208f and the flow passage forming member 209 illustrated in FIG. 5. Note that in FIG. 5, the lead frame 208f, the flow rate sensor 205, and a resin 208r that seals the flow passage forming member 209 are not illustrated.

As described above, the flow rate sensor 205 is mounted on the chip package 208, and is disposed in the upstream portion 237 of the second sub-passage 234b provided in the measurement unit 201m of the housing 201 constituting the physical quantity measurement device 20. The flow rate sensor 205 includes a semiconductor substrate 205s and a diaphragm 205d provided on the semiconductor substrate 205s.

The diaphragm 205d is a thin film-like portion provided on a semiconductor substrate 205s. The diaphragm 205d is provided, for example, by forming a concave cavity portion 205c having an opening on one surface of the semiconductor substrate 205s facing a mounting surface f1 of the lead frame 208f on which the flow rate sensor 205 is mounted. The diaphragm 205d is a part of the surface layer portion of the semiconductor substrate 205s on the side opposite to the mounting surface f1 of the lead frame 208f, and a part of the surface layer portion of the semiconductor substrate 205s is a thin film-like portion exposed on the cavity portion 205c.

The flow rate sensor 205 has a heating resistor (not illustrated), a temperature-sensitive resistor, a fixed resistor, a plurality of electrode pads, and the like that are provided on the surface of the diaphragm 205d opposite to the cavity portion 205c of the semiconductor substrate 205s. More specifically, the flow rate sensor 205 is a thermal air flow meter that has a pair of temperature-sensitive resistors on both sides of the heating resistor, for example, in the flow direction of measured gas 2, and measures a flow rate of air based on a temperature difference between these pair of temperature-sensitive resistors.

The physical quantity measurement device 20 according to the present embodiment has the following configuration as the greatest feature. The physical quantity measurement device 20 includes a flow rate sensor 205 which is the thermal air flow rate sensor, and the ventilation flow path 210 which prevents the cavity portion 205c on the back surface side of the diaphragm 205d of the flow rate sensor 205 from being sealed. Further, the physical quantity measurement device 20 includes the lead frame 208f having a mounting surface f1 on which the flow rate sensor 205 is mounted, and a flow passage forming member 209 disposed on a back surface f2 opposite to the mounting surface f1 of the lead frame 208f. The ventilation flow path 210 is formed by a first through hole 211 provided in the lead frame 208f and communicating with the cavity portion 205c, a second through hole 212 provided in the lead frame 208f and opened in the mounting surface f1, and a connection flow path 213 that is defined between the lead frame 208f and the flow passage forming member 209 and connecting the first through hole 211 and the second through hole 212.

For example, as illustrated in FIG. 6, the connection flow path 213 has a plurality of flow paths connecting the first through hole 211 and the second through hole 212. More specifically, the connection flow path 213 has, for example, a plurality of vertical flow paths 213a and a plurality of horizontal flow paths 213b. The vertical flow path 213a extends in a vertical direction LD along the shortest path between the first through hole 211 and the second through hole 212. The horizontal flow path 213b extends in a horizontal direction CD that crosses the vertical flow path 213a and connects between adjacent vertical flow paths 213a.

In the example illustrated in FIG. 6, the vertical flow path 213a is continuous with the vertical direction LD from one end to the other end of the vertical direction LD of the connection flow path 213. Further, the horizontal flow path 213b provided at one end and the other end of the vertical direction LD is continuous with the horizontal direction CD from one end to the other end of the horizontal direction CD of the connection flow path 213, and communicates with the first through hole 211 and the second through hole 212, respectively. On the other hand, one end and the other end of the plurality of horizontal flow paths 213b provided between the horizontal flow paths 213b at both ends of the vertical direction LD are connected to one adjacent vertical flow path 213a and the other vertical flow path 213a. In each row of the horizontal flow paths 213b composed of a plurality of horizontal flow paths 213b arranged in the vertical direction LD, the horizontal flow paths 213b of the rows adjacent to each other in the horizontal direction CD are alternately disposed, and the plurality of horizontal flow paths 213b are disposed in a zigzag pattern.

That is, in the example illustrated in FIG. 6, a pair of the horizontal flow paths 213b are disposed at both ends of the vertical direction LD, and the horizontal flow paths 213b adjacent to the horizontal direction CD are disposed at positions shifted from the vertical direction LD. The connection flow path 213 has, for example, four vertical flow paths 213a arranged in the horizontal direction CD, two horizontal flow paths 213b continuous to the horizontal direction CD at both ends of the vertical direction LD, and has 14 horizontal flow paths 213b in each row of the horizontal flow path 213b arranged in the vertical direction LD between these two horizontal flow paths 213b.

In other words, in the example illustrated in FIG. 6, the connection flow path 213 has a total of 42 horizontal flow path 213b in three rows arranged in a zigzag pattern, two horizontal flow paths 213b continuous to the horizontal CD, and four vertical flow paths 213a connected by these 44 horizontal flow paths 213b. Note that the number and arrangement of the vertical flow paths 213a and the horizontal flow paths 213b illustrated in FIG. 6 are one example, and are not particularly limited.

Further, in the example illustrated in FIG. 5, the connection flow path 213 is defined by a groove 208g provided in the lead frame 208f and the flow passage forming member 209 that closes the opening of the groove 208g. The groove 208g is formed to a depth of 50 [μm] or more by, for example, pressing the lead frame 208f. The cross-sectional shape of the groove 208g is, for example, a wedge or a triangle.

The flow passage forming member 209 has, for example, a resin sheet 209a and an adhesive layer 209b arranged on the surface of the resin sheet 209a. More specifically, the flow passage forming member 209 is, for example, a polyimide tape or a Kapton (registered trademark) tape having a heat resistance of 200 [° C.] or higher. The thickness of the resin sheet 209a is, for example, about 50 [μm], and the thickness of the adhesive layer 209b is, for example, about 20 [μm].

Although not illustrated, the connection flow path 213 may be defined by, for example, a groove provided in the flow passage forming member 209 and the lead frame 208f that closes the opening of the groove. In this case, as the material of the flow passage forming member 209, for example, a metal having a heat resistance of 200 [° C.] or higher, heat-resistant glass, ceramics, heat-resistant resin, or the like can be used. In this case, the flow passage forming member 209 can be fixed to the lead frame 208f with, for example, an adhesive. Further, depending on the material, appropriate methods, such as welding, caulking, rivets, welding, for fixing the flow passage forming member 209 to the lead frame 208f can be selected.

In the lead frame 208f, not only the flow rate sensor 205 but also an electronic component 208e such as an LSI is mounted on the mounting surface f1. The flow rate sensor 205 and the electronic component 208e are connected by wire bonding, for example. The flow rate sensor 205 and the electronic component 208e are mounted on the mounting surface f1 of the lead frame 208f via, for example, a die attach film 208d.

The die attach film 208d has a through hole 214 at a position corresponding to the first through hole 211 of the lead frame 208f. The through hole 214 connects the cavity portion 205c of the flow rate sensor 205 and the first through hole 211 of the lead frame 208f and makes the cavity portion 205c and the first through hole 211 communicate with each other. That is, in the example illustrated in FIG. 5, the ventilation flow path 210 is formed by the connection flow path 213 between the through hole 214 of the die attach film 208d, the first through hole 211 of the lead frame 208f, the connection flow path 213 between the lead frame 208f and the flow passage forming member 209, and the second through hole 212 of the lead frame 208f.

Hereinafter, the operation of the physical quantity measurement device 20 of the present embodiment will be described.

As described above, the physical quantity measurement device 20 according to the present embodiment is arranged in the main passage 22 which is the intake body of the internal combustion engine control system 1, for example, and measures the physical quantity including the flow rate of the measured gas 2 which is the intake air flowing through the main passage 22. The measured gas 2 flows into the sub-passage 234 of the physical quantity measurement device 20 from the main passage 22 via the inlet 231 provided in the measurement unit 201m of the physical quantity measurement device 20.

A part of the measured gas 2 that has flowed into the sub-passage 234 from the inlet 231 of the measurement unit 201m of the physical quantity measurement device 20 passes through the first sub-passage 234a and returns from the first outlet 232 of the measurement unit 201m to the main passage 22. As a result, foreign matters such as dust included in the measured gas 2 can be discharged from the first outlet 232 as they are. In addition, the other part of the measured gas 2 that has flowed into the sub-passage 234 from the inlet 231 of the measurement unit 201m of the physical quantity measurement device 20 branches from the first sub-passage 234a at the branch portion 236 and flows into the upstream portion 237 of the second sub-passage 234b, and passes through the flow rate sensor 205.

As described above, the flow rate sensor 205 is a thermal air flow rate sensor that includes a semiconductor substrate 205s and a diaphragm 205d provided on the semiconductor substrate 205s. The flow rate sensor 205 measures the flow rate of air, which is measured gas 2, based on the temperature difference between a pair of temperature-sensitive resistors arranged on both sides of the heating resistor in the flow direction of the measured gas 2. Here, the physical quantity measurement device 20 according to the present embodiment has the following features as described above.

The physical quantity measurement device 20 includes a flow rate sensor 205 which is the thermal air flow rate sensor, and the ventilation flow path 210 which prevents the cavity portion 205c on the back surface side of the diaphragm 205d of the flow rate sensor 205 from being sealed. Further, the physical quantity measurement device 20 includes the lead frame 208f having a mounting surface f1 on which the flow rate sensor 205 is mounted, and a flow passage forming member 209 disposed on a back surface f2 opposite to the mounting surface f1 of the lead frame 208f. The ventilation flow path 210 is formed by a first through hole 211 provided in the lead frame 208f and communicating with the cavity portion 205c, a second through hole 212 provided in the lead frame 208f and opened in the mounting surface f1, and a connection flow path 213 that is defined between the lead frame 208f and the flow passage forming member 209 and connecting the first through hole 211 and the second through hole 212.

That is, in the physical quantity measurement device 20 according to the present embodiment, unlike the conventional thermal air flow rate sensor in which the semiconductor element is mounted on the lead frame via the support member, the flow rate sensor 205 is directly mounted on the mounting surface f1 of the lead frame 208f. As a result, the dimensional accuracy between the mounting surface f1 of the lead frame 208f and the diaphragm 205d of the flow rate sensor 205 can be improved as compared with the conventional thermal air flow rate sensor. As a result, a flow path cross-sectional area facing the measurement surface of the diaphragm 205d in which the heating resistor, the heat-sensitive resistor, and the like are disposed can be accurately narrowed to a predetermined flow path cross-sectional area. Therefore, according to the present embodiment, it is possible to improve the measurement accuracy of the flow rate of the measured gas 2 by the flow rate sensor 205 of the physical quantity measurement device 20.

Further, in the physical quantity measurement device 20 according to the present embodiment, the ventilation flow path 210 connects the cavity portion 205c on the back surface side of the diaphragm 205d of the flow rate sensor 205 and the space facing the mounting surface f1 of the lead frame 208f on the outer side thereof to form the flow path of air. As a result, it is possible to prevent the cavity portion 205c on the back surface side of the diaphragm 205d of the flow rate sensor 205, which is a thermal air flow rate sensor, from being sealed, and to suppress the fluctuation in the air pressure inside the cavity portion 205c.

More specifically, when the pressure of air on the measurement surface side of the diaphragm 205d outside the cavity portion 205c of the flow rate sensor 205 becomes higher than the pressure of air inside the cavity portion 205c, the diaphragm 205d bends inward of the cavity portion 205c, and therefore, the volume of the cavity portion 205c decreases. Then, a part of the air in the cavity portion 205c is discharged to the space outside the cavity portion 205c through the first through hole 211 of the lead frame 208f, the connection flow path 213 between the lead frame 208f and the flow passage forming member 209, and the second through hole 212 of the lead frame 208f.

In addition, when the pressure of air on the measurement surface side of the diaphragm 205d outside the cavity portion 205c of the flow rate sensor 205 becomes lower than the pressure of air inside the cavity portion 205c, the diaphragm 205d bends outward of the cavity portion 205c, and therefore, the volume of the cavity portion 205c increases. Then, the air in the external space of the cavity portion 205c is introduced into the cavity portion 205c through the second through hole 212 of the lead frame 208f, the connection flow path 213 between the lead frame 208f and the flow passage forming member 209, and the first through hole 211 of the lead frame 208f. As described above, the fluctuation in the air pressure in the cavity portion 205c is suppressed.

Accordingly, according to the present embodiment, it is possible to provide the physical quantity measurement device 20 capable of preventing the sealing of the cavity portion 205c on the back surface side of the diaphragm 205d while improving the measurement accuracy of the flow rate sensor 205 which is the thermal air flow rate sensor as compared with the related art.

In addition, as illustrated in FIG. 6, in the physical quantity measurement device 20 according to the present embodiment, the connection flow path 213 has a plurality of flow paths connecting the first through hole 211 and the second through hole 212 of the lead frame 208f.

With this configuration, even if a part of a plurality of flow paths of the connection flow path 213 is blocked, for example, a part of the groove 208g is filled by the adhesive layer 209b of the flow passage forming member 209, the cavity portion 205c of the flow rate sensor 205 can be connected to an external space via another unblocked flow path. Therefore, according to the present embodiment, it is possible to provide the physical quantity measurement device 20 capable of more reliably preventing the sealing of the cavity portion 205c on the back surface side of the diaphragm 205d.

Further, in the physical quantity measurement device 20 according to the present embodiment, the connection flow path 213 has a plurality of vertical flow paths 213a and a plurality of horizontal flow paths 213b. The vertical flow path 213a extends in a vertical direction LD along the shortest path between the first through hole 211 and the second through hole 212. The horizontal flow path 213b extends in a horizontal direction CD that crosses the vertical flow path 213a and connects between adjacent vertical flow paths 213a.

With this configuration, the vertical flow path 213a can connect the first through hole 211 and the second through hole 212 of the lead frame 208f at a shorter distance to reduce the flow path resistance of the ventilation flow path 210. Therefore, the fluctuation in the air pressure in the cavity portion 205c can be suppressed more reliably.

In addition, when the back surface f2 of the lead frame 208f has the groove 208g, the plurality of island-shaped portions surrounded by the vertical flow path 213a and the horizontal flow path 213b on the back surface f2 of the lead frame 208f are formed distributed throughout connection flow path 213. By supporting the flow passage forming member 209 by the plurality of island-shaped portions on the back surface f2 of the lead frame 208f, for example, the adhesive layer 209b of the flow passage forming member 209 can prevent the connection flow path 213 from being blocked.

Similarly, when the flow passage forming member 209 has a groove defining the connection flow path 213 on the surface of the lead frame 208f facing the back surface f2, the plurality of island-shaped portions having the same shape as the island-shaped portion of the lead frame 208f illustrated in FIG. 6 are formed on the surface of the flow passage forming member 209. For example, by supporting an adhesive layer that adheres the flow passage forming member 209 to the back surface f2 of the lead frame 208f by the plurality of island-shaped portions on the surface of the flow passage forming member 209, it is possible to prevent the connection flow path 213 from being blocked due to the adhesive layer.

Further, even if any part of the vertical flow path 213a of the connection flow path 213 is blocked to form a blocked portion, a flow path bypassing the blocked portion is formed by the horizontal flow path 213b connected before and after the vertical direction LD of the blocked portion and the vertical flow path 213a next to the blocked portion. Therefore, according to the present embodiment, it is possible to provide the physical quantity measurement device 20 capable of more reliably preventing the sealing of the cavity portion 205c on the back surface side of the diaphragm 205d.

Further, in the physical quantity measurement device 20 according to the present embodiment, the vertical flow path 213a is continuous from one end to the other end of the vertical direction LD of the connection flow path 213, respectively.

With this configuration, the vertical flow path 213a can connect the first through hole 211 and the second through hole 212 of the lead frame 208f at a shorter distance to reduce the flow path resistance of the ventilation flow path 210. Therefore, the fluctuation in the air pressure in the cavity portion 205c can be suppressed more reliably.

Further, in the physical quantity measurement device 20 according to the present embodiment, a horizontal flow path 213b adjacent to the horizontal direction CD is disposed at a position shifted from the vertical direction LD.

With this configuration, in a plurality of rows of the horizontal flow path 213b arranged in the vertical direction LD of the connection flow path 213, the horizontal flow paths 213b of rows adjacent to the horizontal direction CD can be alternately disposed in the zigzag pattern. In other words, in the plurality of rows of island-shaped portions arranged in the vertical direction LD surrounded by the vertical flow path 213a and the horizontal flow path 213b, the island-shaped portions of the rows adjacent to the horizontal direction CD can be alternately disposed in the zigzag pattern.

As a result, the length of each horizontal flow path 213b in the horizontal direction CD can be shortened. In addition, the island-shaped portions can be disposed at one end and the other end of each horizontal flow path 213b. As a result, the flow path resistance of the individual horizontal flow path 213b can be reduced, and the blockage of the individual horizontal flow path 213b can be more reliably prevented. Therefore, according to the present embodiment, it is possible to provide the physical quantity measurement device 20 capable of more reliably suppressing the fluctuations in the air pressure of the cavity portion 205c on the back surface side of the diaphragm 205d and more reliably preventing the sealing of the cavity portion 205c.

Further, in the physical quantity measurement device 20 according to the present embodiment, the connection flow path 213 is defined by the groove 208g provided in the lead frame 208f and the flow passage forming member 209 that closes the opening of the groove 208g.

With this configuration, the groove 208g can be easily formed on the lead frame 208f by, for example, press working. Further, it is not necessary to form the groove for forming the connection flow path 213 for the flow passage forming member 209, and the configuration of the flow passage forming member 209 can be simplified. This makes it possible to use the flow passage forming member 209 having the resin sheet 209a and the adhesive layer 209b disposed on the surface of the resin sheet 209a, such as a polyimide tape.

In addition, in the physical quantity measurement device 20 according to the present embodiment, the flow passage forming member 209 has the resin sheet 209a and the adhesive layer 209b arranged on the surface of the resin sheet 209a.

With this configuration, the connection flow path 213 can be defined between the lead frame 208f and the flow passage forming member 209 by simply attaching the flow passage forming member 209 to the back surface f2 of the lead frame 208f via the adhesive layer 209b. Therefore, the manufacturing process of the physical quantity measurement device 20 can be simplified to improve the productivity and reduce the manufacturing cost.

Further, when the chip package 208 is molded by the transfer mold, the flow passage forming member 209 can improve the dimensional accuracy of the flow rate sensor 205.

More specifically, the lead frame 208f in which the flow rate sensor 205 is mounted on the mounting surface f1 and the flow passage forming member 209 is disposed on the back surface f2 is disposed in the mold, and functions as a cushioning material when molding the resin 208r that seals the chip package 208. As a result, the resin 208r of the chip package 208 can be molded with high accuracy. Therefore, it is possible to accurately narrow the flow path cross-sectional area facing the measurement surface of the diaphragm 205d of the flow rate sensor 205 to a predetermined flow path cross-sectional area. Therefore, according to the present embodiment, it is possible to improve the measurement accuracy of the flow rate of the measured gas 2 by the flow rate sensor 205 of the physical quantity measurement device 20.

As described above, according to the present embodiment of the present disclosure, it is possible to provide the physical quantity measurement device 20 capable of preventing the sealing of the cavity portion 205c on the back surface side of the diaphragm 205d while improving the measurement accuracy of the flow rate sensor 205 which is the thermal air flow rate sensor as compared with the related art.

Note that the physical quantity measurement device according to the present disclosure is not limited to the configuration of the physical quantity measurement device 20 of the present embodiment. Hereinafter, a modification of the physical quantity measurement device 20 according to the present embodiment will be described with reference to FIGS. 7A to 7D. FIGS. 7A to 7D are plan views illustrating first to fourth modifications of the connection flow path 213 between the lead frame 208f and the flow passage forming member 209 illustrated in FIG. 6, respectively.

Figure 7A:
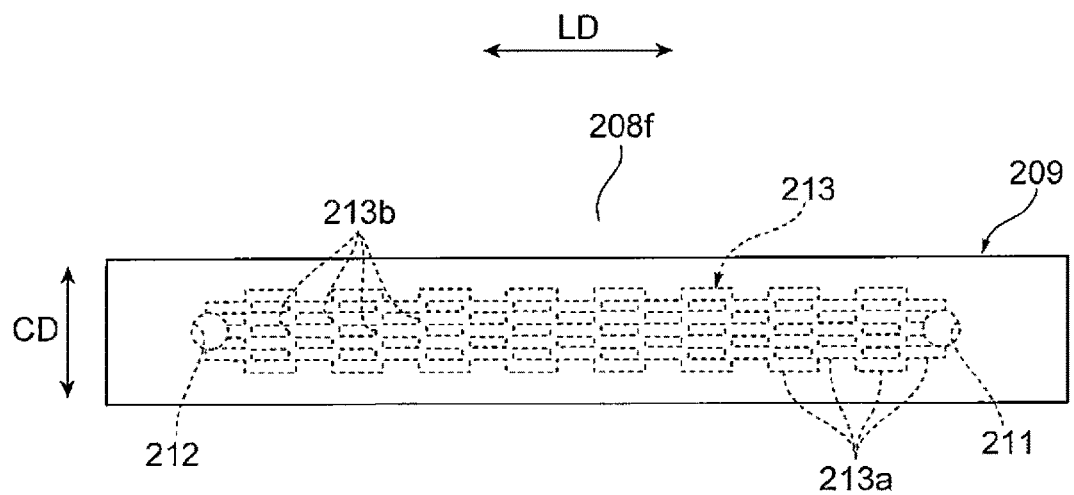
FIG. 7A is a diagram illustrating a first modification of a connection flow path between the lead frame and the flow passage forming member illustrated in FIG. 6.

In the physical quantity measurement device according to the first modification shown in FIG. 7A, the horizontal flow path 213b is continuous from one end to the other end of the horizontal direction CD of the connection flow path 213.

With this configuration, a plurality of vertical flow paths 213a can be connected by a shorter horizontal flow path 213b, and the flow path resistance of the ventilation flow path 210 can be reduced. Therefore, even if a blocked portion is formed in the vertical flow path 213a, the flow path resistance of the bypass flow path that bypasses the blocked portion can be reduced, and the fluctuation in the air pressure in the cavity portion 205c can be suppressed more reliably.

Further, in the physical quantity measurement device according to the first modification illustrated in FIG. 7A, the vertical flow path 213a adjacent to the vertical direction LD is disposed at a position shifted from the horizontal direction CD.

With this configuration, it is possible to prevent deformation of the lead frame 208f, improve the dimensional accuracy of the flow rate sensor 205, and improve the measurement accuracy of the flow rate sensor 205. More specifically, for example, the groove 208g is formed in the lead frame 208f by the press working, and the connection flow path 213 is defined by the groove 208g and the flow passage forming member 209. In this case, the groove 208g is prevented from being continuous with the vertical direction LD, and the warpage of the lead frame 208f in the horizontal direction CD can be suppressed.

Further, as in the embodiment illustrated in FIG. 6, in a plurality of columns of the vertical flow path 213a arranged on the horizontal direction CD of the connection flow path 213, the vertical flow paths 213a of the columns adjacent to the vertical direction LD can be alternately disposed in the zigzag pattern. In other words, in the plurality of rows of island-shaped portions arranged in the horizontal direction CD and surrounded by the vertical flow path 213a and the horizontal flow path 213b, the island-shaped portions of the rows adjacent to the vertical direction LD can be alternately disposed in the zigzag pattern.

As a result, the length of each horizontal flow path 213a in the vertical direction LD can be shortened. In addition, the island-shaped portions can be disposed at one end and the other end of each vertical flow path 213a. As a result, the flow path resistance of the individual vertical flow path 213a can be reduced, and the blockage of the individual vertical flow path 213a can be more reliably prevented. Therefore, the physical quantity measurement device according to the present modification can also achieve the same effect as the physical quantity measurement device 20 of the above-described embodiment.

Figure 7B:
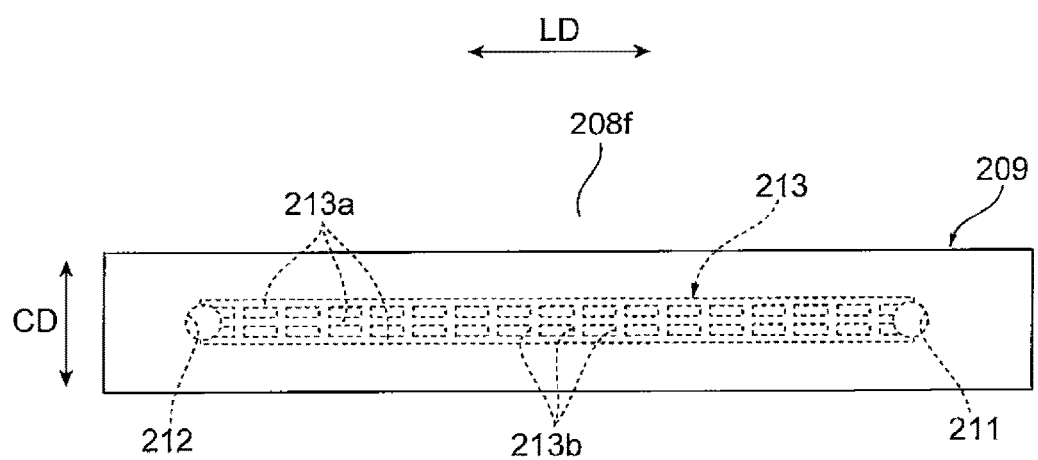
FIG. 7B is a diagram illustrating a second modification of the connection flow path between the lead frame and the flow passage forming member illustrated in FIG. 6.

In the physical quantity measurement device according to the second modification illustrated in FIG. 7B, the vertical flow path 213a is continuous from one end to the other end of the horizontal direction CD of the connection flow path 213. Further, the horizontal flow path 213b is continuous from one end to the other end of the horizontal direction CD of the connection flow path 213. That is, in the physical quantity measurement device according to the second modification illustrated in FIG. 7B, the connection flow path 213 has a grid-like flow path formed by the plurality of vertical flow paths 213a and the plurality of horizontal flow paths 213b.

With this configuration, the first through hole 211 and the second through hole 212 can be connected by the plurality of shorter vertical flow paths 213a, and the flow path resistance of the connection flow path 213 can be reduced. In addition, the plurality of vertical flow paths 213a can be connected by the shorter horizontal flow path 213b, and the flow path resistance of the connection flow path 213 can be reduced. Furthermore, the island-shaped portion surrounded by the vertical flow path 213a and the horizontal flow path 213b can suppress the blockage of the connection flow path 213. Therefore, the physical quantity measurement device according to the present modification can also achieve the same effect as the physical quantity measurement device 20 of the above-described embodiment.

Figure 7C:
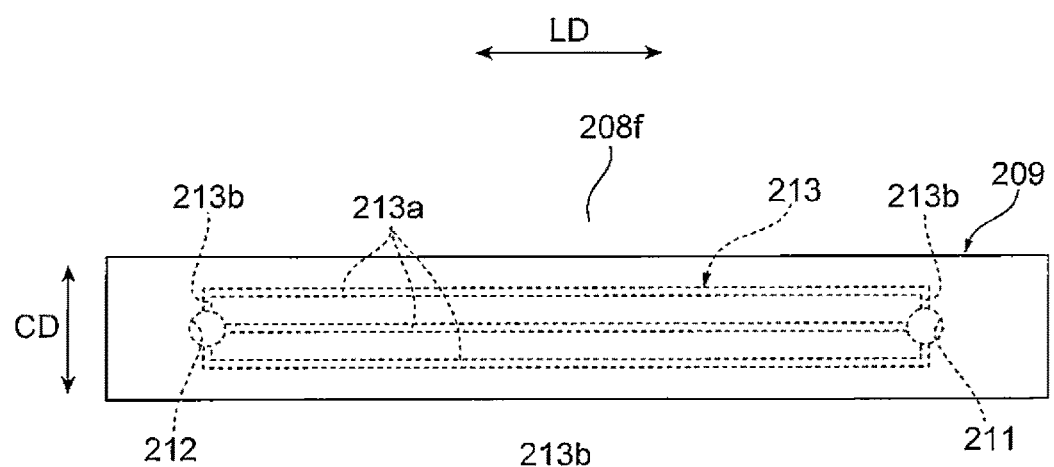
FIG. 7C is a diagram illustrating a third modification of the connection flow path between the lead frame and the flow passage forming member illustrated in FIG. 6.
Figure 7D:
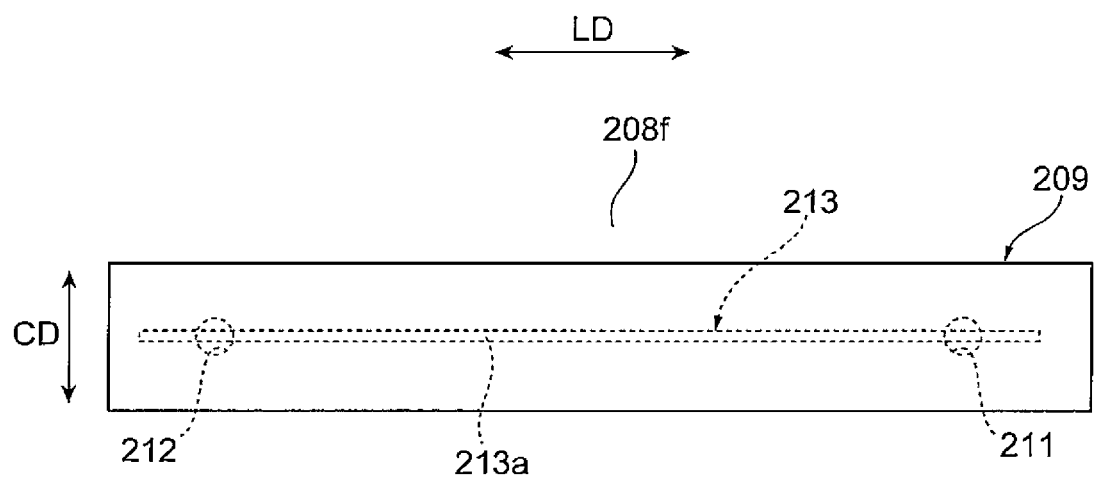
FIG. 7D is a diagram illustrating a fourth modification of the connection flow path between the lead frame and the flow passage forming member illustrated in FIG. 6.

In the physical quantity measurement device according to the third modification illustrated in FIG. 7C, the connection flow path 213 has three vertical flow paths 213a and two horizontal flow paths 213b connecting both ends of the vertical direction LD of these three vertical flow paths 213a. Further, in the physical quantity measurement device according to the fourth modification illustrated in FIG. 7D, the connection flow path 213 has a single vertical flow path 213a connecting the first through hole 211 and the second through hole 212 of the lead frame 208f.

With these configurations, it is possible to provide the physical quantity measurement device capable of preventing the cavity portion 205c on the back side of the diaphragm 205d from being sealed while improving the measurement accuracy of the flow rate sensor 205 as compared with the related art, as in the case of the physical quantity measurement device 20 of the above-described embodiment.

Although the embodiments and the modifications of the physical quantity measurement device according to the present disclosure have been described in detail with reference to the drawings, the specific configuration is not limited to these embodiments and modifications, and even if there are design changes and the like in the range that does not deviate from the gist of this disclosure, these design changes are included in this disclosure.

REFERENCE SIGNS LIST 20 physical quantity measurement device
205 flow rate sensor (thermal air flow rate sensor)
205c cavity portion
205d diaphragm
208f lead frame
208g groove
209 flow passage forming member
209a resin sheet
209b adhesive layer
210 ventilation flow path
211 first through hole
212 second through hole
213 connection flow path
213a vertical flow path
213b horizontal flow path
CD horizontal direction
f1 mounting surface
f2 back surface
LD vertical direction

The invention claimed is:

1. A physical quantity measurement device, comprising:
a thermal air flow rate sensor;
a ventilation flow path that prevents a sealing of a cavity portion on a back surface side of a diaphragm of the thermal air flow rate sensor;
a lead frame that has a mounting surface on which the thermal air flow rate sensor is mounted; and
a flow passage forming member that is disposed on a back surface opposite to the mounting surface of the lead frame,
wherein the ventilation flow path is formed by a first through hole communicating with the cavity portion and provided on the lead frame, a second through hole that is opened on the mounting surface and provided on the lead frame, and a connection flow path defined between the lead frame and the flow passage forming member and connecting the first through hole and the second through hole,
wherein the connection flow path has a plurality of flow paths connecting the first through hole and the second through hole and includes a plurality of vertical flow paths extending in a vertical direction along a shortest path between the first through hole and the second through hole, and a plurality of horizontal flow paths extending in a horizontal direction in an area between the first through hole and the second through hole so as to cross the vertical flow path in the area between the first through hole and the second through hole and connecting the vertical flow paths adjacent to each other, and wherein the plurality of horizontal flow paths extending in the horizonal direction are alternately disposed in a zigzag pattern.

2. The physical quantity measurement device according to claim 1, wherein the vertical flow path is continuous from one end to the other end of the connection flow path in the vertical direction.

3. The physical quantity measurement device according to claim 2, wherein the horizontal flow paths adjacent to each other in the horizontal direction are arranged at a position shifted in the vertical direction.

4. The physical quantity measurement device according to claim 1, wherein the horizontal flow path is continuous from one end to the other end of the connection flow path in the horizontal direction.

5. The physical quantity measurement device according to claim 4, wherein the vertical flow paths adjacent to each other in the vertical direction are arranged at a position shifted in the horizontal direction.

6. The physical quantity measurement device according to claim 1, wherein the connection flow path is defined by a groove provided in the lead frame and the flow passage forming member that closes the opening of the groove.

7. The physical quantity measurement device according to claim 6, wherein the flow passage forming member has a resin sheet and an adhesive layer arranged on a surface of the resin sheet.

8. The physical quantity measurement device according to claim 1, wherein the connection flow path is defined by a groove provided in the flow passage forming member and a lead frame that closes the opening of the groove.

* * * * *